US010002498B2

(12) United States Patent
Sylvester et al.

(10) Patent No.: US 10,002,498 B2
(45) Date of Patent: Jun. 19, 2018

(54) METHOD AND APPARATUS FOR IMPROVED SALES PROGRAM AND USER INTERFACE (71) Applicants: Jason Sylvester, New York, NY (US); Alana Sylvester, New York, NY (US)

(72) Inventors: Jason Sylvester, New York, NY (US); Alana Sylvester, New York, NY (US)

( * ) Notice: Subject to any disclaimer, the term of this patent is extended or adjusted under 35 U.S.C. 154(b) by 0 days. days.

(21) Appl. No.: 14/042,686

(22) Filed: Sep. 30, 2013

(65) Prior Publication Data
US 2014/0372236 A1 Dec. 18, 2014

Related U.S. Application Data (60) Provisional application No. 61/836,071, filed on Jun. 17, 2013, provisional application No. 61/836,028, filed on Jun. 17, 2013.

(51) Int. Cl.
G06Q 30/02 (2012.01)
G07G 1/00 (2006.01)
(Continued)

(52) U.S. Cl.
CPC ........... *G07G 1/0009* (2013.01); *G06Q 20/20* (2013.01); *G06Q 30/0201* (2013.01); *G06Q 30/0241* (2013.01); *G06Q 30/0281* (2013.01)

(58) Field of Classification Search
CPC .................. A45D 44/005; A45D 44/22; A45D 2044/007; G06T 11/00; G06T 11/001;
(Continued)

(56) References Cited

U.S. PATENT DOCUMENTS 6,095,650 A * 8/2000 Gao et al. ............... 351/227
6,293,284 B1 * 9/2001 Rigg ........................ 132/200
(Continued)

FOREIGN PATENT DOCUMENTS

WO 2001077976 A2 3/2000
WO 2012172568 A1 6/2011

OTHER PUBLICATIONS http://www.telegraph.co.uk/technology/news/11146752/How-technology-is-transforming-cosmetics.html (Year: 2014).*
(Continued)

Primary Examiner — Florian M Zeender
Assistant Examiner — Dana Amsdell
(74) Attorney, Agent, or Firm — Furr Law Firm; Jeffrey Furr (57) ABSTRACT The present invention provides a method, apparatus, and program related to a Point of Sale (POS) web-based application/website and user interface that may be applied on any product that can be photographed, videoed, or transformed. The image created through the program can be provided to the customer electronically by email or other service who may want to purchase products or services listed in sequenced steps at a later date with auto generated links, while also allowing the retailer to be able to record the products the customer tried on or used but did not purchase. The program further enhances the shopping experience by allowing the customer or seller to record the sequenced steps with purchased and not purchased products used during any service for any product in any industry which then ties into the program's social media website or various other social media websites.

17 Claims, 3 Drawing Sheets (51) Int. Cl.
*G06Q 20/20* (2012.01)
*G06Q 30/00* (2012.01)

(58) Field of Classification Search
CPC .... G06T 11/60; G06K 9/00268; G06Q 30/02; G06Q 30/0601; G06Q 30/0269; G06Q 30/0281; G06Q 30/0631; G09B 19/00; G06F 3/0482; A61B 5/0088
See application file for complete search history.

(56) References Cited

U.S. PATENT DOCUMENTS

| | | | |
|---|---|---|---|
| 6,643,385 B1 | 11/2003 | Bravomalo | |
| 6,692,127 B2 | 2/2004 | Abitbol | |
| 6,792,401 B1 | 9/2004 | Nigro | |
| 6,937,755 B2 | 8/2005 | Orpaz | |
| 6,959,119 B2 | 10/2005 | Hawkins | |
| 7,634,103 B2 | 12/2009 | Rubinstenn | |
| 8,498,456 B2* | 7/2013 | Legagneur | A45D 44/005 382/118 |
| 2001/0037191 A1 | 11/2001 | Furuta | |
| 2002/0024528 A1* | 2/2002 | Lambertsen | 345/646 |
| 2002/0064302 A1 | 5/2002 | Massengill | |
| 2002/0097251 A1* | 7/2002 | Attar | G06Q 30/06 345/646 |
| 2003/0007071 A1* | 1/2003 | Goto | 348/61 |
| 2003/0065636 A1* | 4/2003 | Peyrelevade | A45D 44/005 706/62 |
| 2004/0110113 A1* | 6/2004 | Huang | G09B 19/00 434/100 |
| 2009/0234716 A1* | 9/2009 | Mallick | G06F 3/0482 705/14.54 |
| 2009/0248472 A1* | 10/2009 | Lloyd | G06Q 10/063 705/7.11 |
| 2011/0093361 A1 | 4/2011 | Morales | |
| 2011/0287391 A1* | 11/2011 | Mallick et al. | 434/100 |
| 2012/0027269 A1 | 2/2012 | Fidaleo et al. | |
| 2012/0044335 A1* | 2/2012 | Goto | 348/77 |
| 2012/0253896 A1* | 10/2012 | Killoran, Jr. | G06Q 10/107 705/14.4 |
| 2013/0236074 A1* | 9/2013 | Hillebrand et al. | 382/128 |
| 2014/0032331 A1* | 1/2014 | Blanch | G06Q 30/0269 705/14.66 |
| 2014/0172588 A1* | 6/2014 | Frankel | G06Q 30/0276 705/14.72 |
| 2014/0249935 A1* | 9/2014 | Daily, IV | G06Q 30/0277 705/14.73 |

OTHER PUBLICATIONS http://web.archive.org/web/20061127222626/http://www.synchronics.com/index1_highres.htm (Nov. 29, 2006 per Wayback Machine).
http://web.archive.org/web/20101018051404/http://onepagecrm.com/increase-sales-features.html (Oct. 18, 2010 per Wayback Machine).

* cited by examiner

METHOD AND APPARATUS FOR IMPROVED SALES PROGRAM AND USER INTERFACE

FIELD OF THE DISCLOSURE

The present disclosure relates generally to an improved sales program and user interface using innovative picture, template picture, transform, video, and link technology in place of or to compliment old inefficient paper sales tools. Under the program, users may track and record all "purchased" and "not purchased" products that they were interested in using but didn't buy at the time of the point of sale (POS). If the user already bought products there will be a seamless way for them to replenish the products directly from our picture product link technology in our program. The programs digital User Interface creates a simple step by step sequence list to record products purchased and not purchased for salespeople, clients and users. The program's User Interface allows the user to list the products that were applied during a service after the point of sale so they have the opportunity to purchase or replenish the products at a later date using our picture product link technology.

BACKGROUND

Traditional POS transactions where a customer purchases goods from a merchant in the merchant's store are often inefficient and do not track all the products. Traditional point of sale programs may not focus on what products were tried on and liked but not purchased which gives insight into what the consumers/users wish to buy and how they wish to buy it. For example, for expensive items, customers may often desire to make several trips to a store before making a purchase. Or items may be related such that the customer may desire to purchase one item of a series now and other related items at a later date. Unfortunately the items the client looked at and were interested in but not purchased are not recorded inside a store system. Often times the clients lose the current paper sales tools containing the product names and info. This inefficiency causes lost sales and confusion for the sales person and client because they only keep a record of what was sold for replenishment and never record the items not sold.

Current consumer shopping trends and transactions have become more complex than the traditional customer-merchant POS model can handle. In some industries, there are also agents/vendors or other intermediaries that sell certain goods at the merchant's location. For example, makeup artists often work direct for cosmetic companies selling their particular brands of makeup in department stores, and boutique stores as freelancers. Often, these makeup artists are not employees of the store but are independent freelancers/sales people that sell one or more product lines from various manufacturers and don't keep records of sold items because they don't ring their sales. Normally these freelancers/salespeople give all charts and information on products to the client which is often lost or misplaced. In some industries, manufacturers may also sell goods directly, usually (although not exclusively) online.

Thus today's shopping experience involves multiple transactions that are possible between (or among) a customer, merchant, agent, manufacturer, or other various parties. To the extent that there are systems or programs for overseeing and monitoring such multiple transactions, the systems or programs that are based on traditional POS techniques are inefficient, outdated and do not keep track of what products are tried on and not sold. Often, the systems or programs are paper based or use simple databases that do not allow for the necessary tracking and follow up which make more complex transactions difficult for the merchants, agents, manufacturers and customers.

Accordingly, there is a need for an improved method and apparatus for a sales system that produces, saves, and analyzes data efficiently to allow for the tracking and follow up of products for customers/users that desire to purchase or use multiple products from multiple parties at multiple times. There is also a need for an improved digital User Interface using our picture/template/transform/video with link technology. This digital User Interface uses a step by step sequence list for each area of the face/body which lists and explains the products used for each step. There are attached product links which are automatically generated for each entered product. These links can be selected in each step to purchase the products electronically at a later date after the point of sale.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Determining What the Customer/User Wants to Buy Using Data of What the Customer/User Used and Purchased or Did not Purchase.

The technology described herein may be used with any product/service in any category/industry that is able to be photographed, videoed or transformed including but not limited to skincare, makeup, clothing, accessories, jewelry, furniture, cars, shoes, room settings, furniture, landscaping, and the like.

As an example the technology may be used to purchase beauty products after a makeover or facial. A makeover and facial consists of multiple sequenced steps using multiple products which are applied to different areas of the face. Each product used during the makeover/facial may be made by a different vendor/manufacturer and have different properties. The technology may also be used to purchase clothing. These products also consist of multiple items, each of which may be made by different vendors/manufacturers. Each customer may need assistance to choose and apply the right combination of makeup/skincare products or clothing to achieve the desired look.

The customer may need the help of a salesperson to choose a unique combination of products to create a desired look for that customer. In the retail sales chain, goods may be sold by salespeople that are present on the store floor. These salespeople may be independent freelancers (and not store employees) who sell various products that are on the store floor and assist customers in designing unique combinations using different products from multiple vendors/manufacturers that are combined to give the customer the desired look that one brand may not be able to accomplish.

The technology may be implemented by the use of a program on an electronic device such as but not limited to a smartphone, tablet, or computer that is accessible to the user/salesperson at any location that is connected or not connected to the Internet, including, but not limited to, the sales floor. This program can be used for personal use or sales use.

Figure 1:
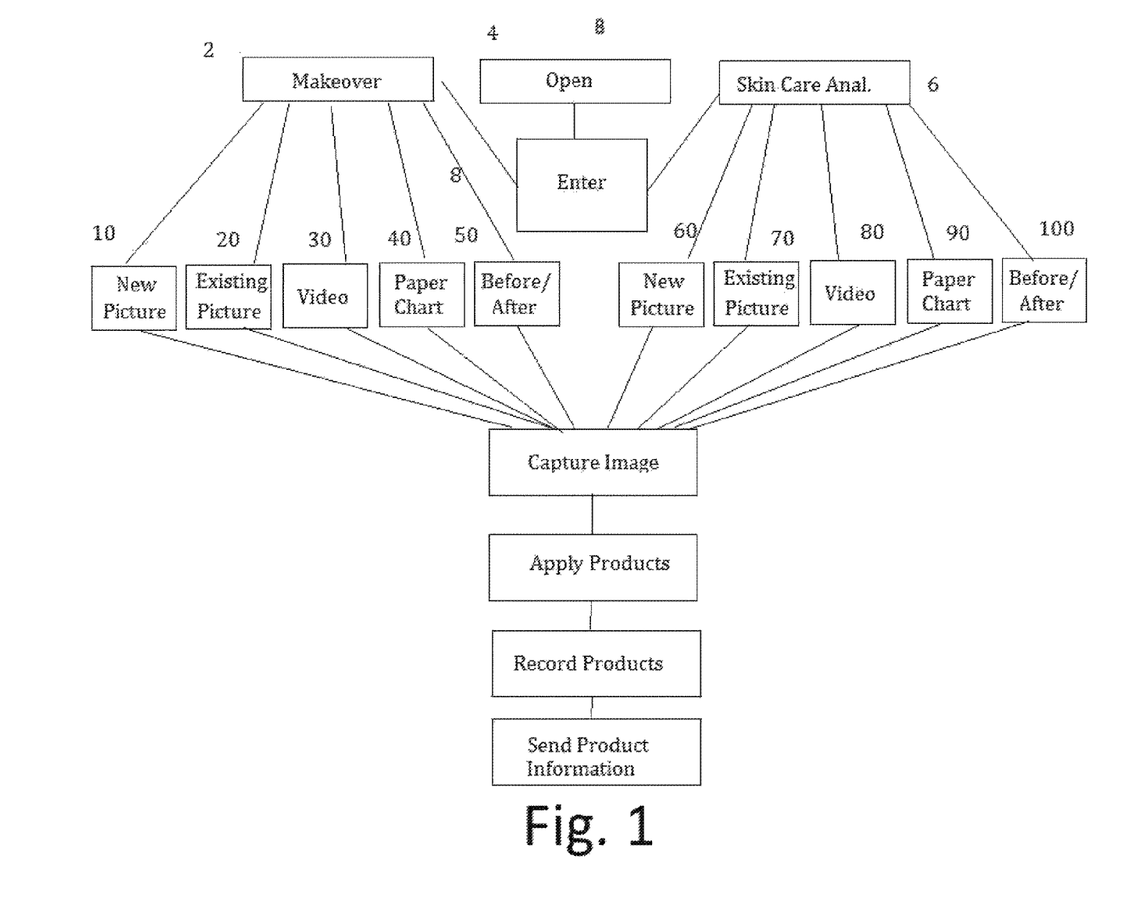
FIG. 1 is a flowchart of a method of opening a program, signing in, selecting Portfolio, and entering the customer/user information in a profile or looking up an existing customer/user profile in the portfolio and or the User/Salesperson selects either Makeover or Skin Care Analysis and is presented with five options to choose from for the Makeover and five options for Skin Care Analysis. These five options for both the Makeover and Skincare Analysis features entail creating an image which allows the user to enter in products with auto generated links in sequenced steps for each area of the face showing how products are used and applied which create the profile. Then you can email or share the profile electronically or save the finished profile to the portfolio with links to purchase at a later date.
Figure 3:
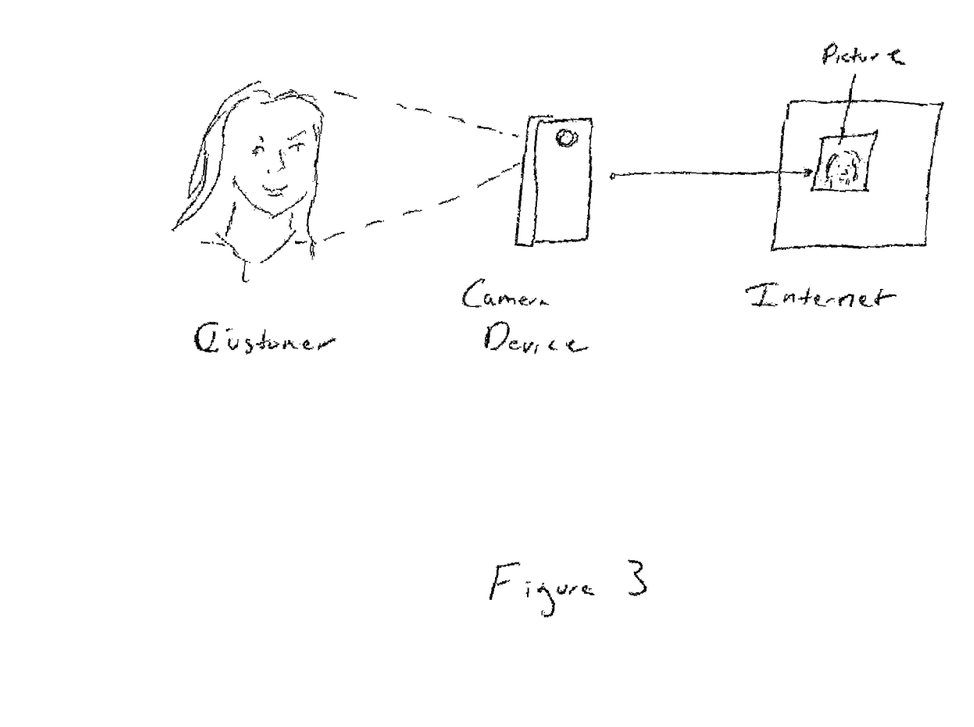
FIG. 3 shows the user having their picture taken and processed by the system.

Turning to FIG. 1 and FIG. 3, shown is an example of using the technology to assist a customer in purchasing a number of makeup and skincare products for his or her face. The user (which may be the customer, makeup artist, esthetician, or salesperson) may open the program on his/her electronic device. After the program opens the user will sign in 4 with a phone number, email, social network or other identification and select and open the Portfolio. The user will either create a new profile and enter the user information 8 or search for an existing users profile in the Portfolio by name, phone number or other method. The existing user information will automatically transfer from their profile in the portfolio to the current makeover/skincare analysis face/body profile image being used. The new makeover/skincare analysis face/body profile image may allow the user to enter their information on the finished image to be saved to their profile in the portfolio for future use before sending it electronically, by social network, or by emailing. If the user already has an account, he or she can choose to store the password in the program so that the user may email his or her past and future looks or profiles to others, without having to sign into the program first.

After the salesperson/client/user signs in, selects Portfolio and selects the clients/users Profile in the Portfolio he/she may choose either the Makeover or Skincare Analysis function 8. When the user selects the Makeover option 2 he/she is presented with five options which are New Picture 10, Existing Picture 20, Video 30, Paper Face Chart Picture 40 and Before and After picture 50. When the user selects the Skincare Analysis option 6 they are presented with a similar five options which are New Picture 60, Existing Picture 70, Video 80, Paper Skin Care Analysis Chart 90 and Before and After picture 100.

For example when the user chooses the New Picture option from the Makeover function the camera launches, and the photo viewer is displayed on the screen of the electronic device. There may be a preset generic outline of the face in the photo viewer which may include an outline of the nose, mouth, eyes, etc. for the user/salesperson to line up to the user/customer's face. The user may also use the facial feature detection for further accuracy. Next, the image of the user/customer is captured using either the generic outline or automatic facial feature detection in the photo viewer and then the picture is approved and processed. Once the image has been confirmed and processed, the user/salesperson may be presented with 2 options to choose from. The user may now choose to either (1) use the original captured image, or (2) transform the original captured image with a generic Face Chart template by matching the facial features and face template feature's together to create a transformed face image with the makeover features layered on top. Then the user selects a designed icon or other image on the screen which may be swiped side to side to expose an opened panel on the screen. The other side of the exposed screen without the panel will show the selected option of either the face picture or transformed face picture. Each area of the pictured face/transformed picture with no panel is lined up next to each listed face area name in the opened panel. Next the user may enter the makeup products in the sequenced steps under each listed area of the face in the open panel. The user will also be able to add additional areas or change the names of the listed face areas into sequenced steps in order to match existing paper sales tools to give the user a customized experience. Then the user may enter the makeup products in the sequenced steps under each listed area of the face or in any customized configuration in the open panel. The user will also be able add links to each listed product to purchase or the links can be automatically generated for each product when entered. The user may also add notes, application instructions, videos, and other features in the open panel as well. All information may be recorded verbally in case the user/salesperson doesn't want to enter anything manually. The picture or transformed picture will then be approved and saved to the user/client's Profile in the Portfolio. The user/salesperson will also have the option to send the approved makeover electronically to the user/customer with the listed sequenced steps for each area of the face so that they can purchase the products using our generated link technology from their salesperson or via internet at a later date through the convenience of their own home. The user will also be able to send the makeover electronically to any social media site for cross platform brand exposure.

The above Makeover New Picture option process will be exactly the same as the Skincare Analysis New Picture option process except the Skin Care Analysis option process will not have the transform feature.

The above Makeover New Picture option process is exactly the same as the Makeover Existing picture option process except the Makeover Existing Picture option process uses an existing picture from the electronic device.

The above Makeover New Picture option process is almost exactly the same as the Skincare Analysis Existing Picture option process. The only differences between the two options is the Skincare Analysis Existing Picture option process will not have the transform feature and uses an existing picture from the electronic device.

The user may also choose the Video option after selecting either the Makeover or Skin Analysis feature. After the Video option is selected the video viewer is displayed on the screen of the electronic device. There may be a preset generic outline of the face in the video viewer which may include an outline of the nose, mouth, eyes, etc. for the user/salesperson to line up with the user/customer's face to then start recording the video. The user may also use the facial feature detection for further accuracy. Next, the video of the user/customer is recorded using either the generic outline or automatic facial feature detection in the video viewer and when the video is finished it is approved and processed. The Products used or parts of the video may be selected and tagged during or after the recording. Then the sequenced steps may be filled out with the products used. Once the areas of the video are tagged and the sequenced steps are completed the user may link the tagged parts of the video to any of the selected steps to be saved to the users profile. Basically, the user may link any step, product, or area of the face to any related part of the video during or after saving it to the program. The video will then be approved and saved to the user/client's Profile in the Portfolio. The user may add notes, tips or any additional information with the listed steps. The user/salesperson will also have the option to send the approved video electronically to the user/customer with the linked sequenced steps so they can purchase the products from the generated links from their salesperson or via internet at a later date. After the video is processed and saved to the users profile it may be played normally or in a frame by frame fast-forward function that shows the makeup/facial being applied faster. When the video is paused the user will see the products, notes and other information on the paused screen of the electronic device. Users/salespeople may also have the ability to enter or view additional videos on how the Makeup/Skin Care regimen is applied. The Video option will work the same way for both the Makeover and Skincare Analysis functions and the process will work the same. The user may also record additional videos in different timelines. These multiple timeline videos may be put together so the user can see how their skin improved over a set amount of time.

The Paper Face Chart Picture option for the Makeover function and the Paper Skin Care Analysis Chart option for the Skin Care Analysis function will work the same way and have the same process. When the Paper Face Chart Picture option or Paper Skin Care Analysis option are selected the camera launches, and the photo viewer is displayed on the screen of the electronic device. Then the user captures a picture of either the Paper Face Chart, Paper Skin Care Chart or other similar paper sales tool. The picture is then approved and processed. Once the image has been confirmed and processed the user selects a designed icon or other image on the screen which may be swiped side to side to expose an opened panel on the screen. The other side of the exposed screen without the panel will show the exposed Paper Face Chart, Paper Skin Care Analysis Chart or other similar paper sales tool. Then the user may enter the makeup or skincare products in the sequenced steps under each listed area of the face in the open panel. The user will also be able add links to each listed product or auto generated links will appear next to each product to purchase. The user may also add notes, application instructions, videos, and other features in the open panel as well. The user will also be able to add additional areas or change the names of the listed areas into sequenced steps in order to give the user a customized experience. Then the user may enter the makeup or skincare products in the sequenced steps under each listed area in any customized configuration in the open panel. The Paper Face Chart/Paper Skin Care Analysis chart or other paper sales tool will then be approved and saved to the user/client's Profile in the Portfolio. The user may select any sequenced step or any listed area of the face to zoom in on the Paper Face Chart, Paper Skin Care Analysis Chart or other similar paper sales tool. The close-up of the paper Face Chart, paper Skin Care Chart or other similar paper sales tool will show better detail of the written makeup and skincare products for easier reading and viewing of any written notes or applied products used during the Makeover or Skin Care Analysis. This allows the salesperson or user to keep an electronic version of the paper face chart or paper skin care chart in their selected client/user profile in the portfolio in case the original is lost. This also gives users/clients that don't want to be photographed an option to use the program. The face/skin care chart can be sent electronically to the user/customer with the listed steps for each area of the face so that they can purchase the products with the generated links from their salesperson or via the internet at a later date. They can also share their face chart or sales tool through our website or social media affiliates. Users may share their look with other members so they can purchase their looks thru links or direct from the makeup artist as well.

The Before and After Picture option for the Makeover and Skin Care Analysis feature will work the same way and have the same process. When the Makeover Before and After Picture option or Skin Care Analysis Before and After Picture option are selected the camera launches, and the photo viewer is displayed on the screen of the electronic device. Then the user/salesperson captures a before picture which is stored in the user/client's profile in the portfolio. After the Makeover or Skin Care Analysis is finished a second after picture is captured with the camera. Both pictures are then automatically lined up neatly side by side and are listed "Before" on the first picture taken and listed "After" on the second picture taken. Once both images have been approved the user selects a designed icon or other image on the screen which may be swiped side to side to expose an opened panel on the screen. The other side of the exposed screen without the panel will show the listed After picture. Then the user/salesperson may enter the makeup or skincare products in sequenced steps in the open panel next to each area of the face. Each area of the face outside the panel may be selected and tagged. Then the tagged area of the face may be linked to the sequenced step in the panel with the products used for that area of the face. Both the tagged area of the image and the selected sequenced step are linked and confirmed. Each product in each sequenced step will then have auto generated links to be able to purchase that product. The user can add additional areas or change the listed area names into sequenced steps to customize the experience for their own needs. The user may also add notes, application instructions, videos, and other features in the open panel as well. The listed side by side Before and After picture will then be approved and saved to the user/client's Profile in the Portfolio. The user may select any sequenced step which is linked to any area of the face image. Once the sequenced step is selected the image of that linked area of the face will zoom in on the After picture for enhanced detail. The Before and After Picture option will show the user what products were used for each area of the face and how well those products worked. For example a makeup artist can take a picture of the users face before applying multiple products in sequenced steps. Then the makeup artist can take an after picture of the user after the makeover and tag the areas of the face image. Then the tagged areas of the face are linked to the sequenced steps with used products to show how well the products improved the user's appearance or look. Another example would be if the esthetician decides to give a client a facial. The esthetician may take a picture of the clients face before the facial. Then the esthetician may take a second picture of the client after the facial is finished and link the image of a face area to the listed products used in the sequenced steps to show the client what products were used and how much the products improved his or her skin.

Additionally, the program members may capture a picture of their makeover and save their makeover pictures with sequenced steps to the program. Before saving their makeover each member may tag each area of their face image with the used products. Then the member enters all the product names into the sequenced steps. Then the member selects a sequenced step to link it to any area in the face image where the product was used. After the image area is tagged and linked to the selected sequenced step with product information it is saved to the program. After saving the tagged image areas with the linked sequence steps the user may select a sequenced step which will cause the program to zoom in on the area of the face that was tagged. Once the makeup image with linked sequenced steps are saved they may be shared on the internet. A user may open the program to select another user's face makeover image they like. Once both images are selected they are moved side by side on the screen of the device. They may then choose to select the makeup skin transform process so the makeover image they selected and liked can be swapped onto their uploaded face image. This transforming feature may allow the user to see how another user's makeover will look on their own face visually before they choose to purchase those same products in store.

As a further example, there may be a "skin swap" or "makeup swap" in which two photos of two different makeovers may swap skin or swap the makeup on the skin from one picture to another. The swap may also exchange one pictured makeover onto a second uploaded face picture. The swap may also exchange a makeover from an existing uploaded picture onto a second existing uploaded picture in the program. Once the "makeup swap" is completed and saved the user may see their own face with the transformed makeover on their skin along with the linked sequenced steps which include all the products used for each area of the face. When the user selects a sequenced step the linked area of the face image will automatically zoom in to show the full detail of the makeup products listed on that step. As an example of the Zoom in feature for an area of the face, the user can select the listed eye step and the related linked image will zoom in on the eye. The linked zoomed in eye image will show the full detail of the eye shadow and how it was blended and applied. The makeup colors from the makeover image may also be separated and applied to a blank electronic makeup face chart automatically. This may show what individual colors were used during the makeover as an additional option.

All the detailed options and features in this patent application may be used with all five Makeover options which are New Picture, Existing picture, Video, Paper Face Chart Picture and Before and After picture. All of the above features may also be used with all five Skin Care Analysis options which are New Picture, Existing Picture, Video, Paper Skin Care Analysis Chart and Before and After picture. All the detailed options and features in this patent application may also allow the user to customize the listed sequenced steps wording so that they may match the order and wording of an existing paper chart or sales tool. These custom sequenced steps may be changed and entered as areas of the face, products, or any other family of information the user wishes.

Product details and user information may be entered by typing them in, verbalizing them, entering a product SKU, or scanning a barcode or QR code. To utilize the barcode, QR code, or SKU code functionality, the user may select any step below any listed area of the face or body in the opened panel. After the step is selected and the barcode/QR code/SKU code is scanned the user will see the scanned in product appear on the selected sequenced step in the opened panel on the electronic device. This step by step sequence list of products are added to the picture/video with automatic product links for the customer to purchase the products at a later date through website/email/social media. The user may also enter the product links manually. The user/salesperson may also import product names, pictures, videos, client information etc. beforehand so that the information will be stored in the electronic devices database so it is readily available for them during the creation of the client/user's sequenced step by step process.

Additionally, during the sequenced step by step process the user, salesperson or the electronic device owner may attach product links, product videos, product pictures, instructions, illustrations, notes, tips, or anything else that may help promote a product, sell a product, or advertise a product. This technology may take the place of or compliment old paper sales tools, business cards, pictures or other archaic advertising and outdated sales methods, and give the client sequenced step by step instructions on how to apply and layer the products or services (makeup/skincare/clothes/jewelry/shoes/etc.). The photo/video with the used products listed in sequenced steps with instructions may then be sent electronically, emailed, sent by social network or sent from our website/app for the user to review or purchase products at a later date electronically or in-store. The picture with the exposed panel will have links for every product for each sequenced step so the user can buy one or more products anytime via the provided links.

Users/salespeople can also share their picture with the linked sequenced steps with product links to purchase on all social media websites (Facebook, twitter etc.) creating cross advertising. Our program is also very beneficial for users/salespeople to promote and sell their products and looks on a broad platform. This allows the users to be able to see what makeup artists/skin care specialists are using on a larger scale and what looks are new or in. They can also rate different products they try, feature their own looks or receive comments and tips on their own looks. The generated links for products allow users to purchase that look.

The user may have an additional option enabling the salesperson or user to take a picture of the already filled out paper face chart, paper sales tool or other sheet of paper with information. The program may detect and interpret the handwriting of the salesperson on the photographed paper face chart, paper sales tool or sheet of paper with information. The program may then have the ability to save the detected handwriting so it may translate and display the information digitally onto the screen of a device. Basically the program will capture a picture of the words that the user manually wrote on a sheet of paper and translate and enter them into the program so the user can see the words on the screen of the device. This is a fast way for the user to be able to write words on paper and allow the program to translate them so the user saves time and doesn't need to type the needed information a second time.

There may also be an estimate and order option where a user/salesperson can take a photo or video of the products or items and can select each product/image to enter the pricing, description, and notes, by either manually typing the product information, verbally entering the product information, scanning the product SKU, scanning the product barcode or scanning the product QR code. After the information is entered for each product on the picture or video the salesperson may then enter any client information and approve it. After approval the program may automatically generate the tax and freight costs and create a total price for all the products in the picture/video estimate. The picture/video estimate with the embedded product info with pricing and client information may be saved in a program. Then the estimate with the embedded product info and pricing on the photo/video may be sent electronically by email, social network or other method to the user or client. When the client receives the picture/video, they may select each product or image on the picture or video to reveal the information and price of each product on the picture or video. This estimate and order option may be fully integrated to work with a 3rd party mobile POS systems so that the salesperson may accept payment at any location. This estimate/order option may also use our sequenced step with link to image technology listed above.

In the retail segment, users may have an after POS picture emailed to them automatically by the salesperson, which may have automatic follow ups to reference all the products and services purchased and not purchased for each area of the face/body. Each face/body picture may include product links which may direct the user back to the original salesman's (makeup, skincare, jewelry, clothing, shoes, etc.) own email or account so that the user may purchase the product from the same salesperson at a later date through the automated face/body link technology. The links may also be typed in manually for each product in the picture.

This latter purchase potential may provide incentive to salespersons to use the program, since they may still receive their commission on those latter, post POS sales, while also eliminating typical retail store concern of losing clients to online vendor websites. The store or salesperson may also advertise other similar products as well as their looks in the emailed picture to the customer. These products may complement one another and potentially be an additional future sale to be purchased with product links.

As an example, the salesperson may apply mascara on the customer in store. The customer may have purchased or not purchased the mascara from the salesperson but the program saves the data either way. Before the image is sent electronically the program may promote an associated eyelash curler and/or any other product associated with the purchased and/or not purchased products which may have been used on the customer in the store with the salesperson. Then the finished image with sequenced steps including product information is sent to the customer electronically. In addition to having the ability to email or save the customer's face/body picture or other image through the program, the customer or salesperson may also have the option to feature their face/body picture with links on all the used products in the picture or other image along with their upcoming events through social networking. The app/website may also share product tips, step by step sequenced application steps, opinions, or any other information. Users of the program, whether it be customers, salespersons, or their friends, may have the ability to create their own web page including their professional profile within the system with the ability to add opinions, customer likes, and different shared looks which may promote their products for additional third party sales and similar sales.

As a further example, a user/salesperson may open the program and select an existing image or may open the camera/video option. If user/salesperson opens the camera/video option they may capture a picture/video. The user/salesperson selects a product image in the captured picture/video. After the user/salesperson selects the product image from the picture/video the user/salesperson may select a sequenced step to enter the product image's name, price and information. The selected product image in the picture/video is automatically linked to the selected sequenced step with the entered product name, price and other information. The user/salesperson may enter additional information and notes. Then automatic links may appear for each product in each sequenced step. The user/salesperson may save the picture/video. The saved picture/video will include the selected product images with the linked sequenced steps with product information to the program. The sequenced steps may have product links to purchase the entered products at a later time. This combined information may be sent to a user/customer electronically by email or other method.

As a further example, a user/salesperson opens the program and selects the camera or video option. The user/salesperson may capture a picture/video with a woman in a room setting. The user/salesperson may select the necklace image worn by the woman in the picture/video. After the user/salesperson selects the necklace image worn by the woman in the picture the user may select Step#1 to enter the necklace name, price and other information or that information may appear automatically from the program's database. All the information is linked from the selected necklace image in the picture/video to the selected Step#1. Automatic product links to purchase the necklace may appear next to the entered product information in Step#1 and is saved.

Then the user/salesperson selects the shirt image worn by the woman in the picture/video. After the user/salesperson selects the shirt worn by the woman the user/salesperson selects Step#2 to enter the shirt name, price and other information or that information may appear automatically from the program's database. The photo/video with the selected shirt image is automatically linked to Step#2 with the entered shirt information. Automatic product links to purchase the shirt may appear next to the entered product information in Step#2 and is saved.

Then the user/salesperson selects the shoe image worn by the woman in the picture/video. After the user/salesperson selects the shoes image worn by the woman, the user/salesperson selects Step#3 to enter the shoes name, price and other information or that information may appear automatically from the program's database. The photo/video with the selected shoes image is automatically linked to Step#3 with the entered shoe information. Automatic product links to purchase the shoes may appear next to the entered product information in Step#3 and is saved.

Then the user/salesperson selects the Hair image from the woman's head in the picture/video. After the user/salesperson selects the hair image the user/salesperson selects Step#4 to enter the hair product names with pricing and other information or that information may appear automatically from the program's database. The photo/video with the selected hair image is automatically linked to Step#4 with the entered hair product information. Automatic product links to purchase the hair products may appear next to the entered product information in Step#4 and is saved.

Then the user/salesperson selects the face of the woman on the image in the picture/video. After the user/salesperson selects the face image the user/salesperson selects Step#5 to enter the makeup/skincare/cosmetic product names with pricing and other information or that information may appear automatically from the program's database. The photo/video with the selected face image is automatically linked to Step#5 with the entered makeup/skincare product information. Automatic product links to purchase the makeup/skincare/cosmetic products may appear next to the entered product information in Step#5 and is saved.

Then the user/salesperson may select the couch image in the background of the picture/video. After the user/salesperson selects the couch image in the background of the picture/video the user/salesperson selects Step#6 to enter the couch product name with the pricing and other information or that information may appear automatically from the program's database. The photo/video with the couch image is automatically linked to Step#6 with the entered couch product information. Automatic product links to purchase the couch may appear next to the entered product information in Step#6 and is saved.

Then the user/salesperson selects a rug in the background of the picture/video. After the user/salesperson selects the rug in the background of the picture/video the user/salesperson selects Step#7 to enter the rug product name with the pricing and other information or that information may appear automatically from the program's database. The photo/video with the rug image is automatically linked to Step#7 with the entered rug product information. Automatic product links to purchase the rug may appear next to the entered rug information in Step#7 and is saved.

The user/salesperson may continue to select additional product images from anywhere in the picture/video and then select additional sequenced steps to enter the product names, pricing and any other information or the information may appear automatically from the program's database. This will allow each selected product image in the picture/video to be linked to each selected sequenced step with the listed product names, pricing and other information or that information may appear automatically from the program's database. Product links may appear automatically next to each product in each sequenced step to purchase. The user/salesperson saves the picture/video with the linked steps with the product information to the program. The user/salesperson may send the picture/video with linked steps with product information and product links electronically by but not limited to email or social network. The products image in the picture/video may be selected and linked to a selected entered product in a sequenced step so that when a user selects a product in a sequenced step the linked product image in the picture/video is zoomed in and enhanced for greater product detail. This program may complement the estimate and order program or other program listed in this patent. If the video option is selected the products selected in the video will be linked to the selected steps with the listed products to have the ability to be purchased at a later date with the automatic or entered product links.

As an additional feature that may be in combination with one or more of the other features described herein, the user/customer/salesperson may have the option to link the steps in the video to the listed steps with the entered product information so when a listed step with the entered product information is selected the video will fast forward to that sequenced step in the recorded video.

II. Gathering Data on What the Customer does not Buy

The program may show products or services within the created image that the customer may want to purchase at a later date, with a focus on what the customer did not buy, therefore identifying future sales opportunities. Customers may not purchase goods immediately for a variety of reasons, including, but not limited to, them not being sure what to purchase while in the store, not having the money to purchase the product or service while in the store, overlooking products that they didn't grasp while in the store, or losing the information about the product or service by misplacing old sales tools (such as the store paper face chart). The salesperson may have the ability to email the face or body picture or any other image to the customer which may include links to purchase the products or services. This picture or image with product info and links may not be viewed as spam or other advertising by the customer since they already pre-approved it when they registered for the service. This program may be included as a complementary extension to in store services.

By utilizing this program, companies may be able to review and track not only what products or services were purchased, but also, maybe more importantly, what products or services were not purchased. This data may yield valuable information regarding which products were used, tried on, or otherwise considered by the customer but were not ultimately purchased during the POS.

This valuable information may allow the company to see what sales methods and products are working and what are not working during the POS so they may focus on how to improve sales by adjusting what products they sell, promotions, brand awareness, pricing, product line cancellations, adjusting inventory, etc. to stay lean and avoid an unknown potential loss of sales in the future.

Figure 2:
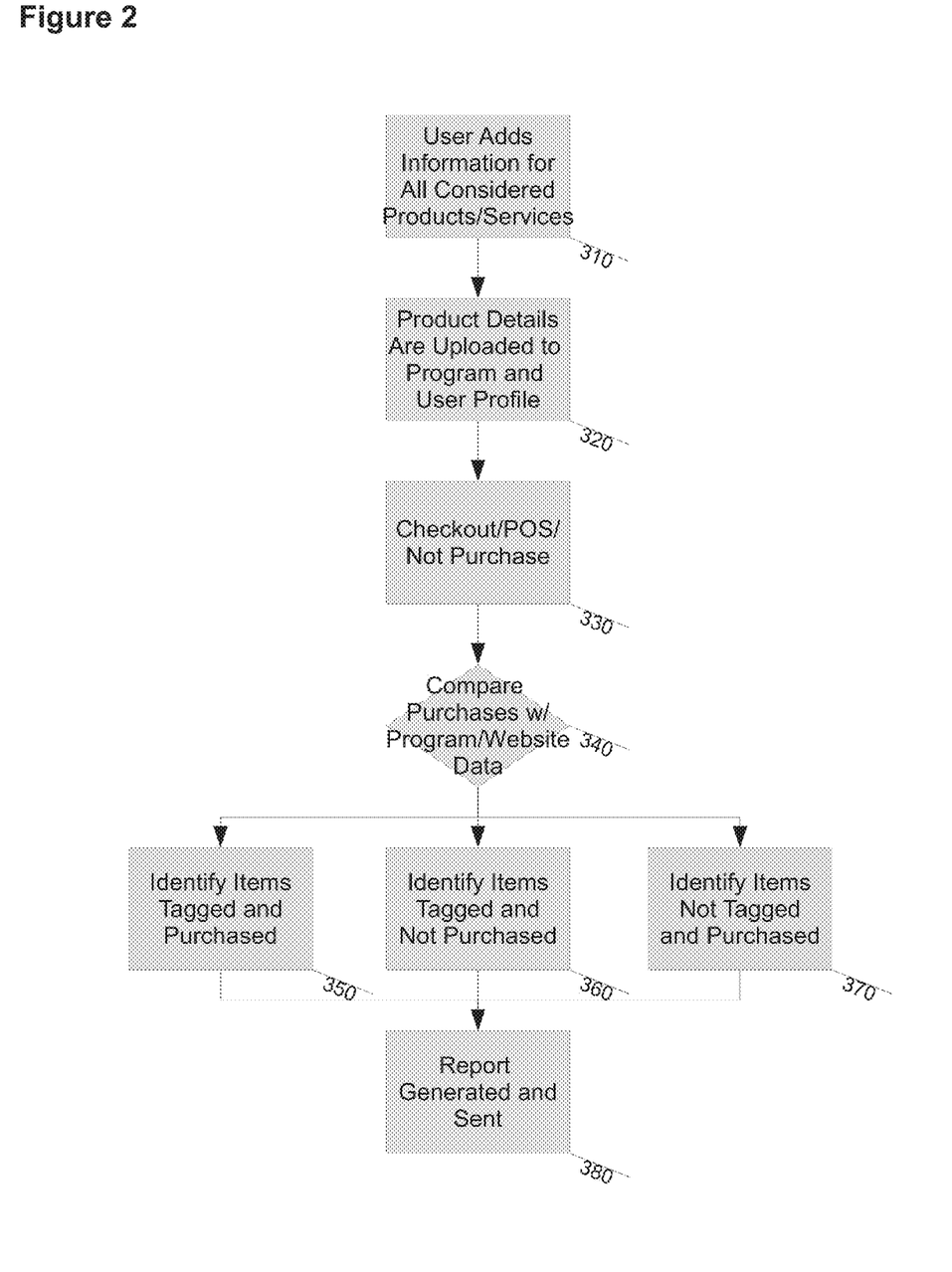
FIG. 2 is a flowchart of a method of enabling a retailer, user, or seller to track and get data on which products and services were tagged, tried on, or otherwise considered by the customer and either subsequently purchased or not purchased in accordance with some embodiments.

Turning to FIG. 2, shown is an example of using the technology to assist a company in tracking and reporting on products or services that were purchased and products and services that were considered by the customer and not purchased. As described previously, the user may add information for all the products and services they tried on, worn, or otherwise considered while in the store 310. The details on those products and services are then uploaded to the program and customer's profile 320. When the customer is ready to proceed to the POS (or decides not to purchase anything at all) 330, the program, through integration with the POS system, will identify what products or services were purchased 340. This data will then be used to identify and track products and services that were considered/tagged in the program and purchased 350, considered/tagged in the program and not purchased 360, and not tagged in the program and purchased 370. This data will then be put in a user readable format report and made available to the company 380.

As another example, jewelry salespeople and customers may also use the program. In the jewelry industry, customers may often look at a piece, or pieces of jewelry, and not actually make a purchase right away due to the large price of the item or items. Instead, they may need time to think and consider such a large purchase, and may return at a later time to complete the purchase. Instead of the salesperson or customer manually writing down the SKU or description and price of the jewelry on a card, or other paper based tool, which can be easily lost, the user/salesperson can use the camera on their device to capture an image of the customer wearing the jewelry and import the image into the program. In addition to having the picture with product description and information sent to the customer electronically the customer may purchase that item from that salesperson at a later time. The customer may be able see how the jewelry looks on them and may have the ability to solicit feedback and opinions on the worn jewelry and how it looks on them from friends, family, and other users by utilizing the app/website or various other social media websites. The user may follow up with the salesperson direct. The salesperson may also have automatic follow ups with the customer/user for each piece of jewelry tried on. This technology may be used with clothing, shoes, makeup or any other product or service that can be photographed to be purchased or tried on.

Furthermore, customers may enter in the product or service SKU number or they can scan the barcode for each item they considered, and save each item to a particular area of the face/body picture or other image. Once the items are saved to the program in their device they may send the picture or other image with the information to themselves electronically via email or other service with reminders to purchase the items at a later date. Users may schedule automatic reminders to follow up on purchased and not purchased products within the program, which will automatically show in the users profile in their portfolio on their dedicated social webpage within the program's website or the information may be emailed to them. The salesperson or user may be able to select each product used or worn and mark them purchased, not purchased, or interested. If another user sees something they like which another member posted, then the user can click on the image or the automatically generated link to purchase the product direct with the salesperson or through a $3^{rd}$ party website.

This program may be a great way for businesses to analyze products, inventory and other data with a focus on products not sold. The program may help stores create and understand data about products not sold and why they weren't bought. Some uses of the data may include but aren't limited to why a customer looked at or considered a product but did not purchase it. This data may also help stores understand which products aren't selling and what they can do to improve their sales. The program may allow users to track and save data on products not sold which is something that may have never been done in any industry before. Typically, businesses only keep track of what was purchased to track inventory needs or to send replenishment reports to the customer, and do not pay attention to what was not purchased.

III. Interfaces to Follow Upon Purchases and Stimulate Future Sales

This technology may replace or compliment old sales tools such as paper charts, tear sheets, business cards, manually written SKU numbers, instruction sheets, and the similar. This may yield many benefits, including, but not limited to, helping preserve the environment, reducing company costs by reducing the amount of paper needed, reducing the number of hours worked by employees, increasing employee productivity, improving sales, improving salesperson follow ups, and providing users with a simplified personalized shopping experience.

This technology may analyze what is—and what is not—selling, provide information on customer behavior, reduce the risk of the customer misplacing the product information, provide a new digital service that makes it simple and fun for users to understand what products or services were used, were purchased and were not purchased for a more informed sales follow up.

Additionally, the app/website may show all the sequenced steps that were used to create their look and may have the option to purchase products that were tried on or otherwise considered but were not purchased at the POS to be purchased at a later time.

Information on products and services that were both purchased and not purchased will be catalogued on the website through the face or body picture/image link technology so that other users may be able to purchase those items with automatically generated links to $3^{rd}$ party websites.

The program provides retailers/manufacturers/salespeople/users analytical data on which products were purchased and not purchased. This program data provides the salesperson a second chance to follow up on the products not sold during the point of sale so they have another opportunity to sell these products at a later date that may otherwise be overlooked. The program data also gives the salesperson the knowledge and opportunity to generate automatic follow ups on the purchased products with the client for additional replenishment sales. This data also gives the salesperson a better understanding of the clients likes and dislikes and what products, styles, and categories they may promote to the customer for additional future sales.

The website may have private groups for users to hide photos, or public groups to show everyone what products were used or worn. Through the program users may search by the shopper name, artist name, product name, topics, questions, skin concerns, and the like. Users will also have the ability to sign on via the app/website, Facebook, or other social media site to increase similar content visibility and cross promote. Also the user may choose to be private or public on the website and have their own webpage which will showcase either the customer's own look (created by the customer) or the salesperson's professional profile (created by the salesperson) or both, which may include notes on all the products used along with sequenced step-by-step application instructions, product info, tips, opinions, and any other information relevant to the shopping experience. Everything the user inputs into the program will automatically be sent to their profile on their dedicated webpage within the website. All members may do a simple invite for friends and colleagues to join the websites network to share their experience and product information.

As an example, the user may post a picture from the program to a $3^{rd}$ party social network such as Facebook, or any other social site. The posted picture on the $3^{rd}$ party social website may be selected and the user may be directed back to our app/website for full backward compatibility. The app/website may have Facebook, YouTube, or other social website thumbnail picture which link to similar product topics or the like. If the user likes a product from our program on Facebook, YouTube, etc. then the same likes or comments from that social media site will also be shown on our app/website, which may provide a live feedback look, and users may comment from the website. The site may categorize members by experience and area to promote networking so that members can contact other members with questions and comments or end users can contact members for services or products they like.

The website or app may have an endless scroll social feed and easy invite functionality. The Graph API may allow 3rd party programs to use not only the user's data, but their friend's data when the user connects to the program. The program may be integrated with Facebook and all similar social networks. Additionally, translation services, such as but not limited to Google translate may be utilized to open the program to an international audience.

The user created profiles on the website or app may have add-on features such as but not limited to uploading images and videos with brand information which may be used as their profile background to promote a brand. The salesperson/user or our company can also import any contact lists, products, videos, pictures, or any other client/user data from any 3rd party programs or services direct into our electronic database before the makeover. By entering all the data into our database in advance the salesperson/user can save time since the data is already available to her/him for all selected profiles in the portfolio. This option may save the user the time that it may take to manually enter in names, email addresses, skin type, preferences, or any other information needed to create accounts, groups or the similar. Users may also have the option to create and/or update contacts manually. Also there may be added products and barcodes to a database upfront or the user/salesperson/client may add products and barcodes themselves creating a crowdsourced database.

The program will have a scan and import feature which is able to scan or import any of the salesperson/user's previous physical work including but not limited to paper charts or other paper sales tools. The user can select or create a profile in the portfolio to transfer the scanned in paper charts or sales tools and the sales tools will appear in the selected profile in the program. All the imported data can also be shared with the salesperson/user's dedicated web page on our website/app so there will be a seamless transition between the Portfolio and the programs social website/app. The salesperson/user can schedule automatic reminders to follow up on purchased and not purchased products for any service or industry. These automatic reminders will show up in the selected client/user profile, their dedicated social web page on our website/app or any shared 3rd party program such as but not limited to Outlook, Gmail, or Apple Calendars. There may also be follow up icons that appear in the main Portfolio linking the follow ups to the profile that may be needed to be followed up on. Everything the user inputs into our database will show up automatically in each existing or future profile in their portfolio. All the database information will also appear on their dedicated social web page on our website/app for a full cross platform experience.

The website/app may further be customized with different color backgrounds, themes, or notes which may promote upcoming events, promotions or the similar. The user may also create a custom biography on their website profile for a personalized and professional look. Additionally, users may use their profile to showcase their wedding makeovers, event makeovers, or the similar, which may be used to promote their products or services. Users may have the ability to share their work from the app/website with Facebook, Twitter, Tumblr, Pinterest, Instagram, Youtube, and all other social media websites with cross platform integration. As an example, if an internet user selects the face/body chart or picture/video they may be sent to our website for cross promotion. They may be able to purchase the products on the face/body chart or picture/video through the automatically generated links to 3rd party stores or salespeople. The User/Customer/Salesperson can also share their picture, transformed picture, video, or any other image or information with our program electronically with but not limited to social media affiliates, email, etc. so the user can share their look with others and other users can also purchase their looks direct from the salesperson or online as well.

Businesses may have the ability to create a customized floor plan within the program which may showcase all the products or services that the customer may want to purchase by floor and location. This functionality may be catalogued for a better user experience.

Salespeople may have the ability to access the program database to input all products with their own personalized product information, notes, product application, tips, etc. Once this personalized product information has been entered, the next time the salesperson or user enters or scans the product in the program, the product will automatically appear on the screen of the device with the personalized information. This may save the salesperson or user time and allows them to enter their own unique tips and the like.

Our app/website will have a Yelp, LinkedIn, and Facebook combined look with full integrated cross platform social functionality so that various products and services may be under one website. Furthermore, the website may also have member generated YouTube, or similar videos, which may include directions on how to apply or wear products or use services with sequenced step by step instructions to either promote the product or the users work, among others.

Groups created within the website that share similar face/body features, similar styles, and similar product choices may be analyzed to examine shopper behavior and product popularity, etc., which may help to determine what products should be promoted or advertised to them. Products and similar products the group liked may be promoted or advertised by providing the users within the group with outside store links.

The sequenced steps in the program may be embedded into the picture or video. The sequenced steps may also be separated from the image or video onto a different part of the displayed program on the device. All information may be typed, videoed, or entered through a voice recording into the program. The image with linked sequenced steps with listed products or other information may be embedded into Facebook pages, blogs or any webpage or other medium on the internet.

An automatic user ranking system may be used to show what looks users vote to be best. The users may vote to display the most popular makeup artist/skincare specialist, stylist looks, best shoes at the moment, clothing, skincare, and any other information or products from other industries.

Users may have the ability to create a barcode or QR code for magazines, runway show brochures, or any other promotional materials with the program. Other users can scan these created barcodes or QR codes with the program to be linked with opportunities to view and purchase the products or services advertised in that magazine, runway show brochure, or other promotional material. For example a magazine page that is showcasing clothing on a model never shows what makeup the artist used on that model so we would have a QR CODE at the bottom of that page with a link to our website to purchase the makeup that the model is wearing from that magazine page. As a further example runway models are always showcasing their clothing in magazines or runway shows. Our technology would allow for the stylist or makeup artist of that model to be able to promote what products were worn and used on them which can then be purchased through our auto generated links.

Dermatologists, as well as estheticians, may be able to utilize the product information used in the skin analysis chart, image or picture with the linked step by step sequenced virtual product sheet to show what products were used and how they were applied in the correct order with tips, notes, etc. It may also show how and where to use each product on the face. The user may also be able to purchase products at a later date thru auto or manually entered links. On the website/app, members may suggest what products work for their skin type and open a forum for other members to share products, tips, notes, etc. with similar skin conditions. The skincare specialist may have a virtual log of not only what products the clients purchased, but also the products the client did not purchase. The salesperson/customer/user may send or receive generated emails of their paper sales tool/image/picture from the program so that they may be viewed and/or purchased through a skincare specialist or online with links at a later date.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a nonexclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer readable storage medium having computer readable code stored thereon for programming a computer (e.g., comprising a processor) to perform a method as described and claimed herein. Examples of such computer readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
having a user sign in and open a Portfolio on a computing device where the user is selected from a group consisting of a consultant, customer, a makeup artist or salesperson;
having the user search for a user's profile and create a new profile if one does not exist;
having a user apply at least one make over product to a first user's face;
displaying an image of the first user's face;
aligning a face template with the image of the first user's face;
using a camera to electronically record the face template aligned image of the first user's face;
entering information electronically about the at least one make over product in sequenced steps that each product was applied;
creating hyperlinks that link to the entered product information;
applying the hyperlinks to respective areas in the template aligned image of the first user's face corresponding to where the at least one make over product was applied;
saving the template aligned image of the first user's face with the hyperlinks and the entered information as electronic data in an electronic medium;
sending the electronic data;
tracking the use of the at least one make over product during a shopping session with the user by a second user where the tracking includes saving second electronic data related to at least one make over product that was not purchased by the first user during the shopping session;

having automatic reminders to alert the second user to follow up with the first user on the at least one make over product not purchased;

allowing a user to select each respective area in the template aligned image of the first user's face;

providing respective second hyperlinks to selected respective areas in the template image of the first user's face, the second hyperlinks linking to an application for purchasing the at least one make over product applied to the first user in a facial region corresponding to selected respective area in the template image of the first user's face;

and, correlating information about the at least one make over product applied to the first user's face with a Point of Sale (POS) system to identify which of the at least one make over product was purchased and which was applied but not purchased.

2. The method as in claim 1, further comprising sharing the details of the face image with hyperlinks on the Internet.

3. The method as in claim 1 further comprising swapping makeup from the face image onto a second, different face image while online.

4. The method as in claim 1, wherein the selected make over product can be scanned in by a bar code for the tracking the use of the make over product for each area of the face.

5. The method as in claim 1, further comprising sharing of the face image with hyperlinks on a website.

6. The method as in claim 1, further comprising having the face image side by side with an image of the face before the at least one make over product was applied.

7. The method as in claim 1, further comprising having a user share the face image with another person.

8. The method as in claim 1, where the face image is created by the second user in a store; and the face image with hyperlinks is emailed to a first user to be purchased via the second user.

9. The method as in claim 1, further comprising: applying at least one make over product with professional directions on a user.

10. The method as in claim 1, further comprising where the first user is a customer.

11. The method as in claim 1 further comprising that a user is applying make over products outside of a store.

12. The method as in claim 1 further comprising that a user is applying at least one make over product at a home.

13. The method as in claim 1 where a user is a physical person applying make over products from home using a guide from the internet.

14. The method as in claim 1 where user selects one of a new picture, existing picture, video, or a paper face chart picture for alignment with the face template.

15. The method as in claim 1 where the face image can be double tapped on an area to zoom into that area.

16. The method as in claim 15 where the zoomed in area can be shared electronically.

17. The method as in claim 1 further comprising printing the image to give a user.

* * * * *